US008446252B2

(12) United States Patent
McGuire et al.

(10) Patent No.: US 8,446,252 B2
(45) Date of Patent: May 21, 2013

(54) INTERACTIVE PRODUCT PACKAGE THAT FORMS A NODE OF A PRODUCT-CENTRIC COMMUNICATIONS NETWORK

(75) Inventors: Kenneth Stephen McGuire, Cincinnati, OH (US); Dean Larry DuVal, Lebanon, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 507 days.

(21) Appl. No.: 12/750,855

(22) Filed: Mar. 31, 2010

(65) Prior Publication Data

US 2011/0239497 A1 Oct. 6, 2011

(51) Int. Cl.
*G05B 19/00* (2006.01)

(52) U.S. Cl.
USPC ....... 340/5.9; 340/5.91; 340/5.61; 340/539.1; 340/572.1; 340/691.1; 235/375; 235/383; 705/14.1; 705/14.4; 705/14.55; 705/14.56; 705/26.1

(58) Field of Classification Search
USPC .................... 340/5.9, 5.91, 6.1, 572.1–572.9, 340/691.1–691.8, 500, 5.61, 539.1; 705/14.1–14.39, 14.4–14.73, 16–25, 26.1–27.2, 705/28; 235/375–386
See application file for complete search history.

(56) References Cited

U.S. PATENT DOCUMENTS 5,841,365 A * 11/1998 Rimkus ........................ 340/5.61
6,468,638 B2 10/2002 Jacobsen et al.
6,676,014 B2 * 1/2004 Catan ............................ 235/375
6,774,818 B1 8/2004 Alfredsson et al.
6,844,821 B2 * 1/2005 Swartzel et al. ........... 340/691.6
7,005,985 B1 * 2/2006 Steeves ....................... 340/572.1
7,044,380 B2 * 5/2006 Knehr-McLaren et al. ........................ 235/462.01
7,058,365 B2 6/2006 Kugler
7,152,040 B1 * 12/2006 Hawthorne et al. ............. 705/16
7,493,336 B2 * 2/2009 Noonan ................................ 1/1
7,535,337 B2 * 5/2009 Overhultz et al. ........... 340/5.91
2001/0028301 A1 10/2001 Geiger et al.
2002/0167500 A1 11/2002 Gelbman
2004/0018422 A1 1/2004 Islam et al.
2005/0084136 A1 4/2005 Xie et al.
2005/0134461 A1 6/2005 Gelbman et al.
2005/0156707 A1 * 7/2005 Kudo ........................... 340/5.91
2006/0015408 A1 * 1/2006 Brown ............................ 705/22
2006/0125604 A1 * 6/2006 Vaiana ....................... 340/10.41

(Continued)

OTHER PUBLICATIONS

International search report dated Nov. 7, 2011, 10 pages.

*Primary Examiner* — Benjamin C Lee
*Assistant Examiner* — Ryan Sherwin
(74) *Attorney, Agent, or Firm* — David K Mattheis; Kim W Zerby

(57) ABSTRACT

A communications-enabled packaged product allows a consumer to partake of communications within a product-centric network. The packaged product performs the functions of a communications node in the network. The packaged product may include two portions, one portion being a reactive label which may be affixed to the packaging and a second part being a "smart communications card" that is separate from the packaging and portable. Each part includes a communications element and an information storage and retrieval element and may include various means for downloading and uploading information into the storage and retrieval elements. In one aspect of its use, the invention allows the consumer to transmit and receive information about the product. In another aspect of its use, the invention allows the consumer to carry information about other similarly enabled products in their possession for use in shopping trips.

14 Claims, 4 Drawing Sheets

U.S. PATENT DOCUMENTS

| | | | | |
|---|---|---|---|---|
| 2006/0226990 | A1 * | 10/2006 | Broad et al. | 340/573.1 |
| 2006/0282326 | A1 * | 12/2006 | Lombardi | 705/14 |
| 2007/0040024 | A1 * | 2/2007 | Murofushi et al. | 235/383 |
| 2007/0159298 | A1 * | 7/2007 | Zegelin et al. | 340/5.91 |
| 2007/0290869 | A1 | 12/2007 | Debord et al. | |
| 2008/0048102 | A1 | 2/2008 | Kurtz et al. | |

* cited by examiner

INTERACTIVE PRODUCT PACKAGE THAT FORMS A NODE OF A PRODUCT-CENTRIC COMMUNICATIONS NETWORK

FIELD OF THE INVENTION

This invention relates generally to the packaging of consumer products, particularly to the use of electronically enabled packaging that can form a node in a communications network to link the package to a network, a consumer with other consumers and with the product manufacturer and/or distribution chain, for continued exchange of information.

BACKGROUND OF THE INVENTION

The use of labels to describe the contents, utility and benefits of a packaged product and, thereby, to advertise that product to a prospective customer, is as old as the use of containers that hold and display such products.

The typical product label provides only a fixed and unchanging description of the packaged product. We shall call such a label a "static" label. The purpose of the static label is twofold. First, it is an advertisement, whose appearance is meant to attract the eye of a potential customer. Typically, to fulfill this function, the static label displays pictorial content that is recognizable as designating a particular brand in which the customer may or may not have confidence and to which the customer may or may not be loyal.

Second, and perhaps most important, the label conveys information about the contents of the packaged product being considered by the customer for purchase. This information can be in the form of a written description or it can also be pictorial in nature. Additional material may be printed on portions of the label to give the purchaser instructions as to product use and the like. The package itself may contain more detailed information on a separate insert, if the amount of such information exceeds the carrying capacity of the label. In short, the label has met its purpose if it is sufficiently attractive, representative of the product manufacturer and informative of the product contents.

Typically, aside from detailed instructions on product use that may be contained in a package insert, the provider of the labeled package has given no particular consideration to functions the label or package could perform after the purchaser leaves the store and brings the product home. If the customer has purchased the labeled product, it can be assumed that the label has done its job.

Social networking has become an important and ubiquitous activity in the lifestyles of many people, consumers certainly included. The combination of universally available mobile communications devices and the desire of individuals to remain connected with peer groups and groups of other like-minded individuals, has led to the formation of social networks of various sizes and complexity. Individuals who interact through these networks can both provide information to others and avail themselves of information, virtually as soon as it becomes available.

One form of information that is of interest to consumers is real-time product-centric information. This is information relating to the use of specific products and groups of related products that would be difficult to obtain from other venues. Such product-centric information and the groups that disseminate and use it act, in effect, as self-help groups and can become co-creators of new uses for a product, offer chat-room type environments to discuss products and can suggest the development of new products to fill voids in suites of existing products.

To support product-centric networking, it would be exceedingly useful if a product itself, through developments in electronic packaging and labeling, can become an inexpensive communication device for the consumer and form a node in the product-centric network. Such communications devices, if made a part of the product itself, can immediately provide the consumer with embedded information that would register the product with the company producing it and provide identification of that particular product within the network. The company itself will ultimately wish to support such networking, because it serves to build product loyalty. This can be enabled through developments of the company's website to include means by which the consumer can communicate directly using the communications-enabled packaging to be discussed more fully below. Thus the company can become a repository of useful information about the product, which it can download to those consumers who possess the proper communications devices. For example, the manufacturer may wish to enable simple product registrations or inform the consumer about recalls or changes in formulations.

From the point of view of the consumer, this offers two modes of interaction. In one mode, the consumer uses the enabled product as the communications node and both uploads and downloads information from the company and to the company. In another mode, the consumer becomes part of a product-centric social network, which may include pre-existing communications methods and networks that extend beyond the enabled package, but which use the enabled package as an entry-point to the social network.

By partaking in such a product-centric network, the consumer can become a co-creator of new products, find new uses for old products, suggest product improvements and the like. In addition, the manufacturer can engage the consumer, through the network, in dialogues that benefit the manufacturer and for which the manufacturer can offer the consumer rewards, sent directly to the node. In effect, the network becomes a dedicated on-line test group for the manufacturer, for which the manufacturer should be properly appreciative.

Inexpensive communications devices are already widely available in the form of special use cell-phones. The circuitry that enables such mobile communications is small, highly integrated and inexpensive. Indeed, the most expensive parts of such communications devices are the packages that hold the circuitry, the keyboards for inputting phone numbers and the displays themselves. By reducing the complexity of this ancillary equipment and by using circuit fabrication techniques such as described in Jacobsen et al., U.S. Pat. No. 6,468,638, which is fully incorporated herein by reference, together with flexible keyboards such as described in Alfredsson et al. U.S. Pat. No. 6,774,818, which is fully incorporated herein by reference, and by powering the device with flexible power sources such as described in Islam et al. US 2004/0018422, fully incorporated herein by reference or as described in Kurtz et al. US 2008/0048102, fully incorporated herein by reference, a product package can be fabricated that will serve as a communications node in a product-centric network. It is the purpose of the present invention to provide the consumer with such a communication-enabled product package that forms a node in a product-centric social network.

SUMMARY OF THE INVENTION

In one aspect the invention comprises a communications-enabled packaged product that can form a node in a product-centric consumer network. The package comprises an electronically enabled communications system formed as part of a reactive label. The system may be a part of a label affixed to the product package or optionally removable, or it may be a separate card or insert that accompanies the product or is displayed near to the product. The system may be enabled to access a dedicated telephone number or other wireless data network whereby it gains entry to a website or other data repository or communications system. The system may incorporate a flexible power supply, wireless electronic communications circuitry, a flexible keyboard, a random access memory unit (RAM) for storing and retrieving consumer information, a read-only memory unit (ROM) that stores both product information and operational logic, and, in certain embodiments, may include electro-optical circuitry for creating a visible, dynamic display. The packaged product can be powered by small flexible batteries, small photovoltaic cells or any of a wide variety of small, flexible power sources such as devices that extract energy from a RF transmitter (such as an in-store transmitter) or that extract energy from ambient electromagnetic fields.

In one aspect such a packaged product incorporates a logic-driven feedback property by which information may be transferred between the package, the consumer and other similarly enabled packages within a store or possessed by the consumer.

In one aspect the package provides a communications mechanism by which a consumer can communicate with other like-minded consumers and disseminate, discuss and gather information related to products of mutual interest.

In one aspect the package provides a communications mechanism by which consumers can communicate information between themselves and a manufacturer or purveyor of products. In this aspect, a manufacturer can obtain marketing information and reward those consumers who provide it via an on-line test group and/or a product-centric network.

DETAILED DESCRIPTION OF THE INVENTION

In one embodiment of the present invention a communication-enabled packaged product provides a consumer with the ability store and retrieve various types of product information and to partake of product-centric social networking. The package includes a communication portion that forms a node in such a product-centric network. It also includes a memory (information storage and retrieval) portion in the form of ROM and/or RAM, that both enables the retrieval of fixed product information (ROM) and both storage and retrieval of information (RAM) provided by and to the consumer. This information is of the type that is relevant to the use of the specific product and that may include the consumer's experiences with the use of the product. In another aspect of the invention, the memory portion (RAM) can be updated with information such as the amount of the product remaining in the package as well as the amounts of other products associated with that product that the consumer possesses.

Figure 1:
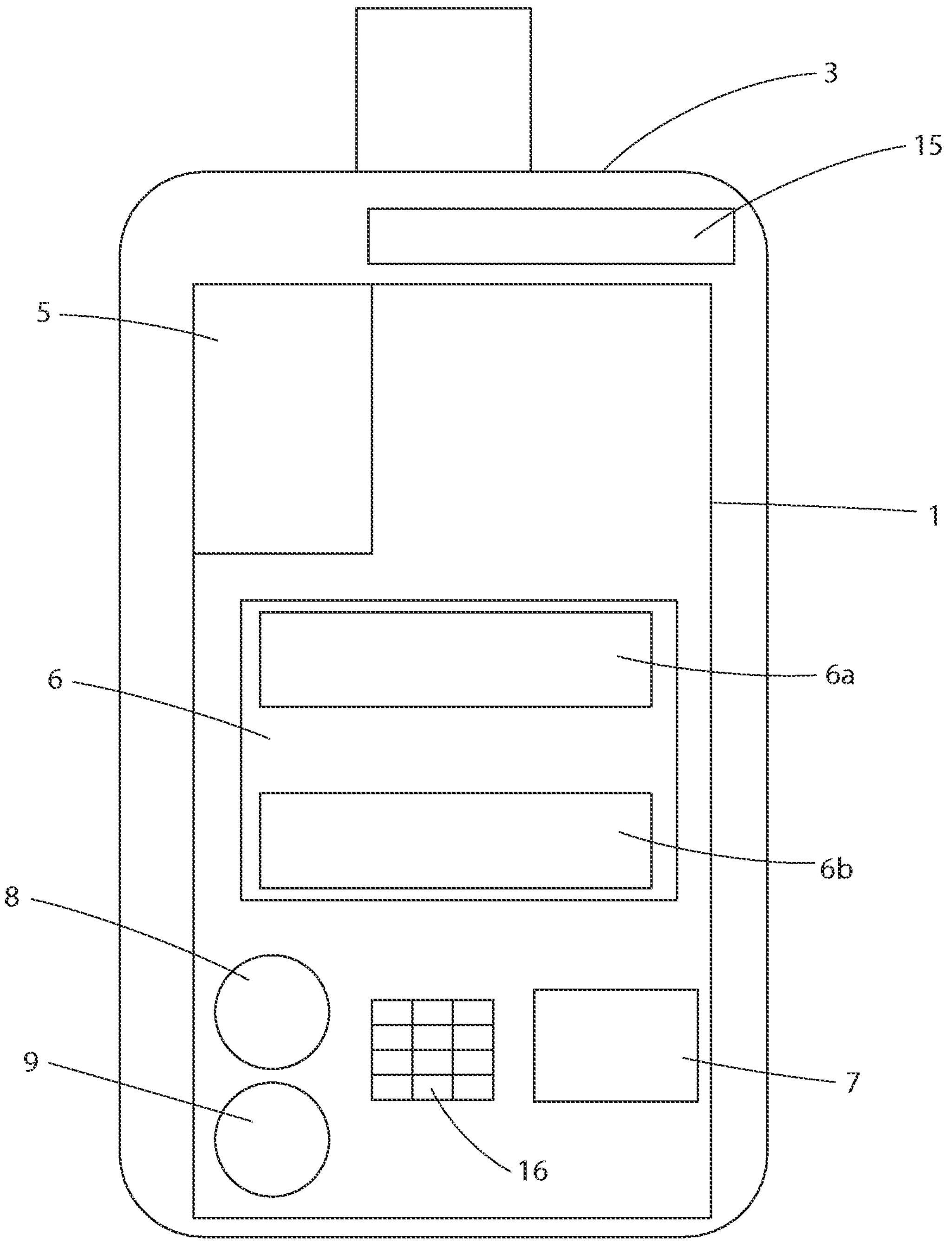
FIG. 1 is a schematic representation of an exemplary communications-enabled packaged product of the present invention, showing its external appearance.

Referring first to FIG. 1 there is shown a schematic illustration of an embodiment of the present invention. The electronically enabled portion of the packaged product is a reactive label (1) that includes a communications portion to be described below. The label is shown as being affixed to a bottle (3), but it can be removable and taken by the consumer on subsequent shopping trips. The packaged product need not be in a bottle, it can be in a jar or any container suitable for holding and/or dispensing the product. The electronically enabled portion may also include an imbedded sensor (8) that detects the product level within the container and automatically communicates that level to an information storage element (to be further described below).

Examining the reactive label (1) further, there is shown an energy source (7) which can be a battery, a capacitor, a super capacitor, or a photovoltaic cell, which will be used to power an information processing, storage and retrieval portion (see below) that includes a RAM and a ROM and a means for inputting data to the RAM, such as a flexible keyboard (16). In another aspect of the invention, information can be input to the RAM through a communications circuit, bypassing the keyboard. In yet another aspect of the invention, information can be input into the RAM at the point of purchase of the product, through the use of a magnetic data transfer interface (15) or "card swiping" device or the like.

In yet a further aspect of the invention, a similar communication module in another product package already in the consumer's possession can communicate with the present package and convey such information about that other product as identification data and the amount of contents remaining.

Figure 2:
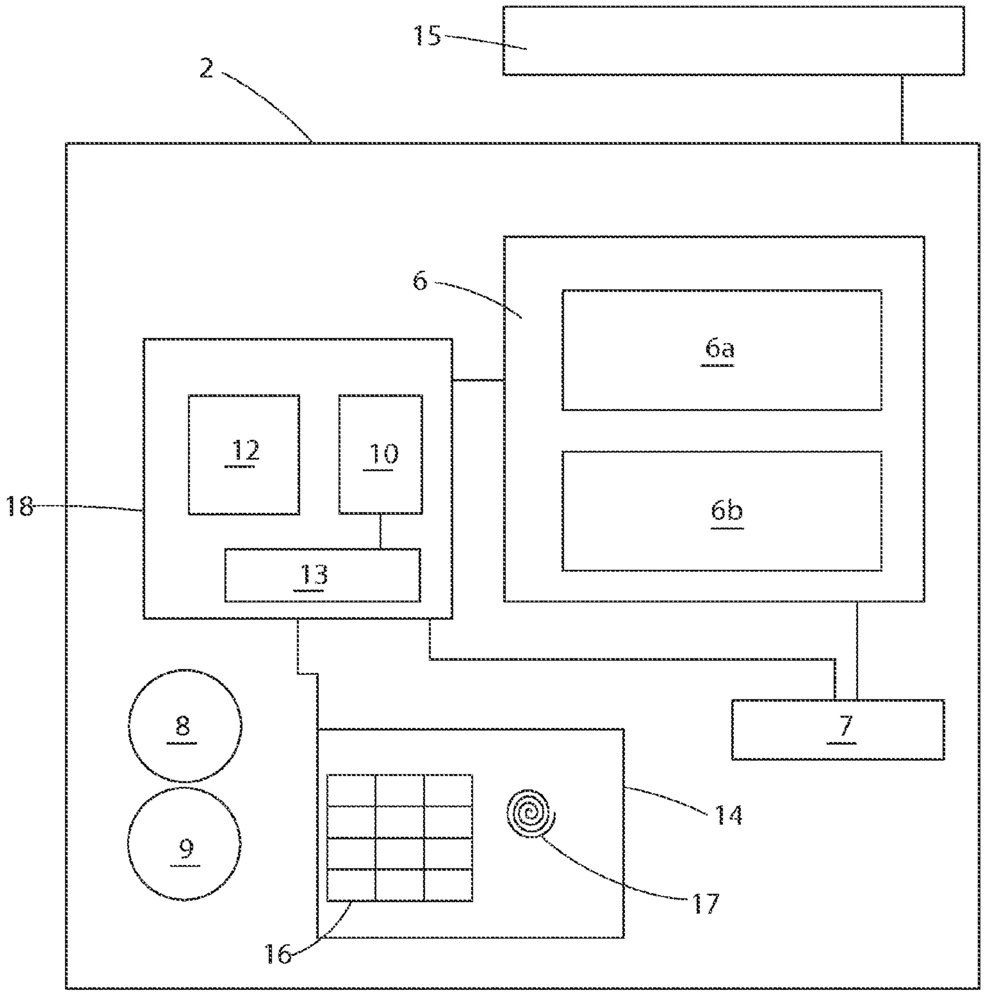
FIG. 2 is a schematic representation of a block layout diagram implementing the communications device in the packaged product of FIG. 1, showing the preferred components and their schematic interconnections.

Referring now to FIG. 2, there is shown a schematic and simplified diagram of the electronics circuitry that, when encapsulated, forms the reactive label of FIG. 1. In one aspect of the invention, this element is fabricated on a flexible substrate (2) by an appropriate fabrication process that would satisfy the objects of the present invention. The substrate and the integrated electronic and electromechanical devices upon it are part of the fabrication and are entirely encapsulated within the reactive label of FIG. 1. It is noted that the layout of the individual circuit elements on the substrate is not critical, except that space should be optimally utilized. It is further noted that all individual circuit components are known in the prior art in one form or another. It is also noted that flexible substrates can have circuitry imprinted on them using several methodologies, such as the assembly processes disclosed in the prior art previously cited.

As already shown in FIG. 1, the substrate (2) includes a communications module (14) for sending and receiving information. The module includes an antenna (17) and a flexible keyboard for the input of information. The module may be enabled to access a telephone number whereby it becomes connected to a website. The module is powered by an energy source (7) which can be a battery or a photovoltaic cell, an information processing and storage portion that includes a microprocessor (13), a RAM (12) and a ROM (10) and a means for inputting data to the RAM, such as the flexible keyboard (16) that is also a part of the communications module (14). A magnetic stripe may be affixed to the portion for inputting and outputting information at the checkout counter of a store. The use of such a magnetic stripe also allows the inputting or product information at the point of purchase.

The reactive label ((4) in FIG. 1) can, optionally, be removable from its bottle ((3) of FIG. 1) and carried by the consumer on a shopping trip, where it can be used to download information from other packaged products possessed by the consumer into its information storage (12) portion.

Figure 3:
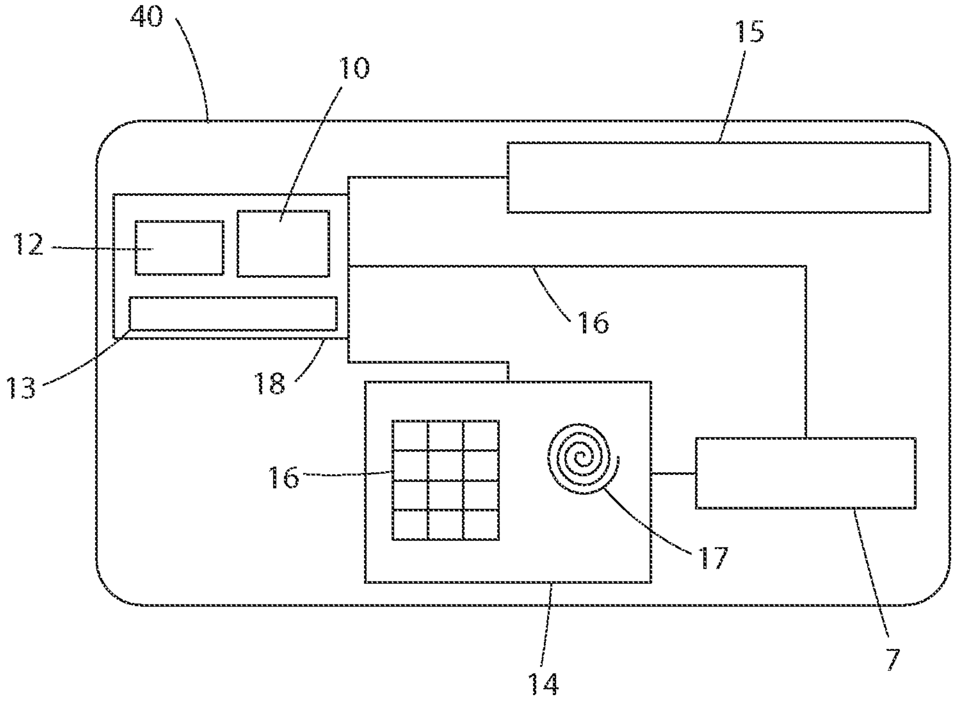
FIG. 3 is a schematic representation of a "smart card," which is an encapsulated communication-enabled circuit that can be carried by the consumer.

In one embodiment of the invention, the first electronically enabled portion of the package (1) as shown in FIG. 1, is accompanied by a second electronically enabled portion (40) that is separated from and independent of the container (3), is portable and can be carried by the consumer, and can communicate with the first portion (1). This second portion, which is shown in FIG. 3, is in some aspects of its size, portability and certain forms of its use, analogous to a "smart" credit card that is augmented with logic and communications abilities. This smart communications-enabled card (simply, "smart card") can include all of the communications means as in the reactive label of the first embodiment and it can also include, optionally, such an additional communications means as a magnetic stripe (15) or the like for inputting information electronically at a point of product purchase. For ease of discussion, this second electronically enabled portion will be denoted either a "smart card" or a "communication smart card" if there is a need to emphasize its communications function.

Examining the smart card (40) in schematic FIG. 3, there is shown a communication module (14) for sending and receiving information. This module includes a flexible keyboard (also termed a keypad) (16) for the input of data, a small antenna (17) for wireless transmission of information and associated circuitry (not shown). The circuitry for such a communications module is described in Kugler, U.S. Pat. No. 7,058,365.

The communications module (14) is powered by an energy source (7) which can be a battery, a capacitor, a super capacitor, or a photovoltaic cell. An information processing and storage portion, also powered by the energy source (7), includes a microprocessor (13), a RAM (12) and a ROM (10). Data can be supplied to the RAM by the flexible keyboard (16). In another aspect of the invention, information can be input to the RAM through the communications circuit (14), bypassing the keyboard. In yet another aspect of the invention, information can be input into the RAM at the point of purchase of the product, through the use of a magnetic stripe (15) on the card and a card swiping device at the checkout counter. In still another aspect of the invention, a communication module in another product package in the consumer's possession can communicate with the present package and convey such information about that other product as identification data and the amount of contents remaining.

Since the functionality of the communications portion does not require high power, a small strip of PV cells, typically about 1.5 volts, should be sufficient. Kurtz et al. US Published Patent Application 2008/0048102, which is fully incorporated herein by reference, discloses a wide variety of flexible and printable power supplies that would be appropriate for this embodiment.

In one aspect of the invention, the card (40) is an encapsulation of a flexible substrate by an appropriate fabrication process that would satisfy the objects of the present invention. The substrate and the integrated electronic and electromechanical devices upon it are part of the fabrication process used for the fabrication of the reactive label as described in relation to FIG. 2. It is noted that the layout of the individual circuit elements on the substrate and the card is not critical, except that space should be optimally utilized. It is further noted that all individual circuit components are known in the prior art in one form or another. It is also noted that flexible substrates can have circuitry imprinted on them using several methodologies, such as the assembly processes disclosed in the prior art previously cited.

In one embodiment the following steps may be initiated by the consumer to enable connection to a product-centric network or to register a product or a series of purchases with a retailer's or manufacturer's data base.

Step 1: Customer purchases a communications-enabled, reactively labeled packaged product which may also include a separate smart communications card, either of which can either be activated at the shelf, at the point of purchase by the purveyor or can be activated by the consumer at home.

Step 2: Consumer stores information on the reactive label of the product or on the communications card relating to other similarly enabled products possessed by the customer.

Step 3: As the consumer continues to use the product, the consumer uploads information about such use into storage within the reactive label or the smart card. The product itself checks on its level.

Step 4: The consumer continues to download company-supplied information pertaining to product information, including updated and new information relating to the product and to related products.

Step 5: The consumer may engage in social networking to obtain information about the product from other users, rather than from the company.

Step 6: The consumer goes shopping and brings along the separate smart card, which has been used to check on the levels of all similar products possessed by the consumer.

Step 7: The consumer is about to make several purchases, so checks product levels to see that all needed products have been purchased.

Step 8: At checkout, consumer swipes card to obtain download of any current information of product.

In one embodiment the packaged product may communicate with other similarly enabled products or a suitable enabled point of sale system. These communications may facilitate interaction between a plurality of enabled products such that products related to a particular selected product may be identified and may be activated such that locating the related products within a retail environment is made easier. As an example, a shopper may select a particular shaving implement, the selected implement may, either with or without the input of the shopper, communicate with a compatible pre-shave or after-shave product and may induce a change in the visual appearance of the compatible product thereby drawing the product to the attention of the shopper. The secondary product may be in a related market category or may have a complementary use such as a paper towel product identified in association with a hard surface cleaner.

In the market category of cosmetics, an initial selection may trigger a cascade of communications to ease the identification of appropriately compatible products based either on a selected shade or a particular scent such that a combined use of the combination of selected products will yield a harmonious result or prevent a deleterious result through a combination of scents or chemistries.

The label of a package selected by a shopper may be activated. The activated label may subsequently communicate with other packages, a networked device of the shopper or a point of sale device within the retail environment. Communication with the point of sale device may include interaction with the shopper to validate the product or lead to the selection of an alternative product, selected with respect to the desired use or consumer experience. The communication may also result in the identification of related or compatible products for selection by the shopper to enhance the use or experience associated with the initial product selection. The communication may be used as at least part of a product authentication or anti-counterfeiting system. The communication may be used to facilitate an authenticating hand-shake protocol between the product and the point of sale element or between the product and the retailer distributor and/or manufacturer to identify the selected product as genuine.

The communications element may enable the consumer to communicate with other consumers, product retailers, distributors, manufacturers, or combinations of these for the purposes of sharing or receiving information relating to instructions for use, optimizing product performance, loyalty programs, synergistic products, discounts/promotions, warrantee programs, new products, participation in consumer research programs, and combinations of these activities.

The package/label electronic communications element enables the retailer, distributor, and/or manufacturer to track product distribution through transportation systems, warehouses, store shelves, and/or check-out systems for purposes including tracking store shelf-life, store promotions, product promotion efficiencies, store display utilization rates, cross-aisle purchasing rates, distribution efficiencies, home usage rates, alone and in combination. The element may communicate with a network of the respective entities and enables these activities via communicating its unique identity with the network and by the capability of the network to determine the location of the package/label at the time of the communication.

Communications may occur between multiple packages each package comprising the labels described herein. The packages may each contain the same product or may contain related products, may be from a common manufacturer or may be part of a co-branding effort between multiple manufacturers. This inter-package communication may include activating the label display of another package which is part of a joint promotion, loyalty program, or feature when the packaged product is physically displaced as determined by a motion sensitive sensor.

The package may communicate with an in-store point of sale display either in association with a deliberate activation by the consumer or possibly in association with a movement of the package as detected by a motion sensor or by a change in the interaction of the package and the package shelf display brought about by a physical displacement of the package. The point of sale display may subsequently provide more information about the initiating product, about related products, co-marketed products, loyalty programs or other information pre-determined by the retailer, distributor, manufacturer or combinations of these.

Figure 4:
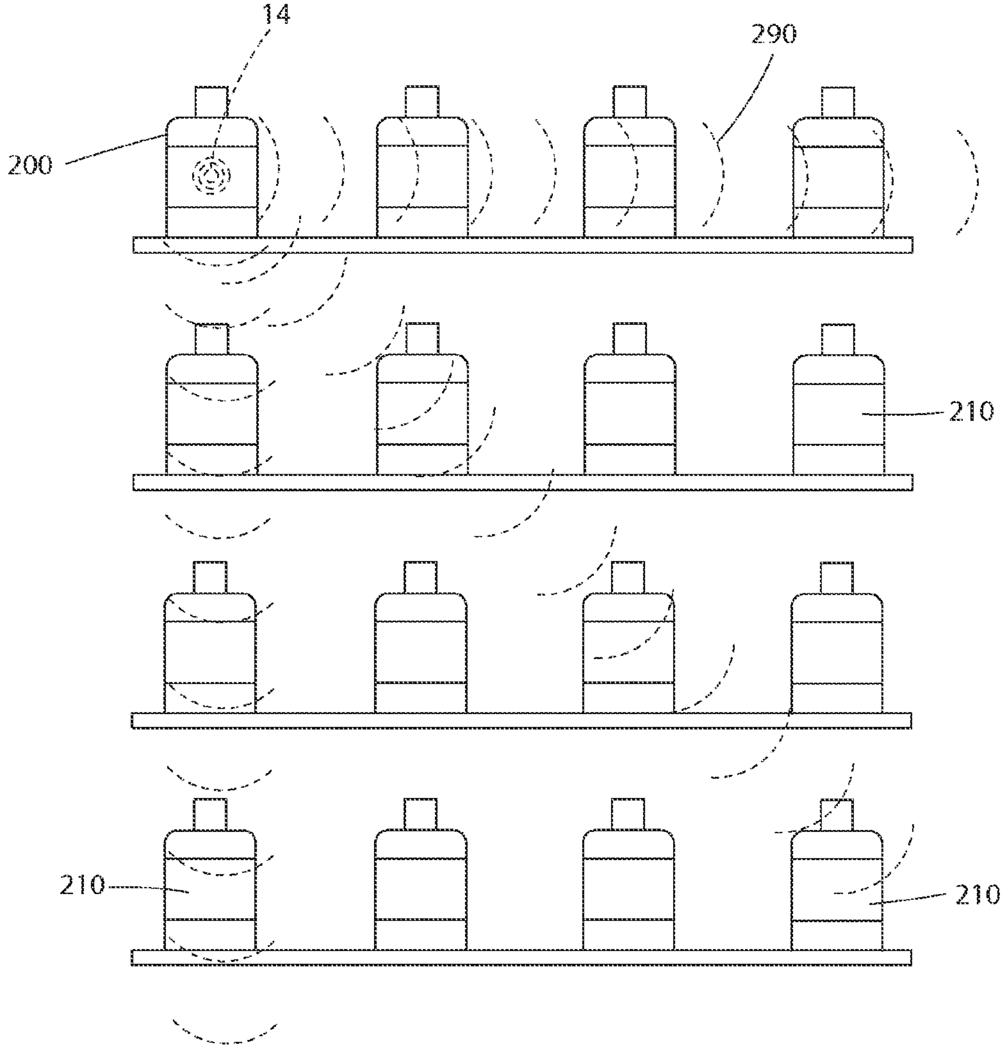
FIG. 4 is a schematic illustration of a large display containing a plurality of reactively labeled packages and including products of different varieties.

Referring next to FIG. 4, there is shown a schematic illustration of a display on which there has been placed a plurality of reactively labeled packages as an array. The different packages in the display contain varieties of the product that are tailored to different physical characteristics of a consumer. These product varieties are positioned at different locations in the display. These locations may be predetermined to allow communicatively coupled visual effects to occur.

The various labels are communicatively coupled by means of the communications module ((14) in FIG. 2) in that data streams can be sent from one label to another to activate displays in each individual label. Activation can consist of causing the pictorial portion of a display unit ((6*a*) in FIG. 1) to light up or generate a movement of a picture. Picture movements and animations can be synchronized so that the display as a whole acts like a giant screen to attract a customer's attention to the display and to focus it on specific products within the display.

One of the labeled packages (200) is shown as sending a wireless electromagnetic signal to other packages (210) that are located at different positions in the display. This package (200) could be the particular package that was picked up by the customer. Upon sensing the customer's interest, the package can respond by activating its own display in a visible manner and be sending out a signal to synchronize the individual display units of the other packages in the large display.

The processing units of different packages can be addressable according to their locations in the display, so that synchronized messaging and display visuals can be achieved. For example, the shelf units of the display can contain circuit elements that activate a label according to its position on the shelf. Thus, the communicatively coupled packages can serve to direct a customer to an appropriate product or they can simply act as a synchronized visually active unit, making the entire display more "eye catching" and attractive to the casual observer.

The ability of a large display to attract the attention of a customer and to focus that attention on a specific portion of the display can be inferred from Xie, Xing et al., US Published Patent Application 2005/0084136 that teaches a methodology by which to cause a viewer's eyes to move in a desired path along a computer screen. This approach, that targets specific image pixels in a screen, can equally well be applied to individual labeled packages arrayed in a large display.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A packaged product comprising a reactive label, the reactive label comprising;

a) a display, b) control logic, c) an input sensor, and d) an electronic communications element wherein the reactive label allows a consumer to communicate directly to the product's manufacturer via a product-centric manufacturer network about the product on topics selected from the group consisting of: instructions for use, optimizing product performance, the product's manufacturer, loyalty programs, synergistic products, discounts/promotions, product registrations, warrantees, and combinations thereof.

2. The packaged product according to claim 1 wherein the reactive label allows the product's manufacturer or distributor to communicate to the consumer about the product on topics selected from the group consisting of: instructions for use, optimizing product performance, loyalty programs, synergistic products, discounts/promotions, warrantee programs, new products, participation in consumer research programs, and combinations thereof.

3. The packaged product according to claim 1 wherein the input sensor senses product consumption rates or remaining product levels and communicates with other consumer-based communication devices selected from the group consisting of: communications cards, personal communication devices, computers, cellular phones, and combinations thereof about the need to repurchase the packaged product.

4. The packaged product according to claim 1 wherein the reactive label allows the product's manufacturer to track product distribution through transportation systems, warehouses, store shelves, and/or check-out systems for purposes selected from the group consisting of: tracking store shelf-life, store promotions, product promotion efficiencies, store display utilization rates, cross-aisle purchasing rates, distribution efficiencies, home usage rates, and combinations thereof.

5. The packaged product according to claim 1 wherein the reactive label comprises a portion of an anti-counterfeiting system.

6. The packaged product according to claim 1 wherein the reactive label is communicatively-coupled to a plurality of reactive labels of similarly communication-enabled package products containing different packaged products that are tailored to different intended consumer uses.

7. The packaged product according to claim 1 wherein the reactive label displays information about different products that are part of a joint promotion, loyalty program, or feature when the packaged product is physically displaced.

8. The packaged product according to claim 7 wherein the reactive label activates the reactive label of different packaged products that are part of a joint promotion, loyalty program, or feature when the packaged product is physically displaced.

9. The packaged product according to claim 7 wherein the reactive label activates a point of sale display containing the different packaged products that are part of a joint promotion, loyalty program, or feature when the packaged product is physically displaced.

10. A packaged product comprising a reactive label, the reactive label comprising;

a) a display, b) control logic, c) an input sensor, and d) an electronic communications element, wherein the reactive label allows a consumer to communicate directly with other consumers in a product-centric social network about the product on topics selected from the group consisting of: instructions for use, optimizing product performance, the product's manufacturer, loyalty programs, synergistic products, discounts/promotions, and combinations thereof.

11. A plurality of packaged products, each member of the plurality comprising a reactive label, the reactive label comprising:

a) a display, b) control logic, c) an input sensor, and d) an electronic communications element, wherein each member of the plurality of packaged products comprises a product selected from a group consisting of a variations of a common product type, and each reactive label is communicatively coupled to the plurality of reactive labels, and wherein the reactive label allows a consumer to communicate directly to the product's manufacturer via a product-centric manufacturer network about the product on topics selected from the group consisting of: instructions for use, optimizing product performance, the product's manufacturer, loyalty programs, synergistic products, discounts/promotions, product registrations, warrantees, and combinations thereof.

12. The plurality of packaged products according to claim 11 wherein the display of at least one member of the plurality is altered in response to input received by the reactive label of another member of the plurality.

13. The plurality of packaged products according to claim 11 wherein the displays of at least portion of the plurality changes in response to a received communication.

14. The plurality of packaged products according to claim 13 wherein the change of the displays comprises at least a portion of each display lighting up and/or generating a moving picture, graphic, or animation.

* * * * *